P. H. THOMAS.
ELECTRICAL DISTRIBUTION SYSTEM.
APPLICATION FILED JULY 6, 1904.
1,137,174.
Patented Apr. 27, 1915.
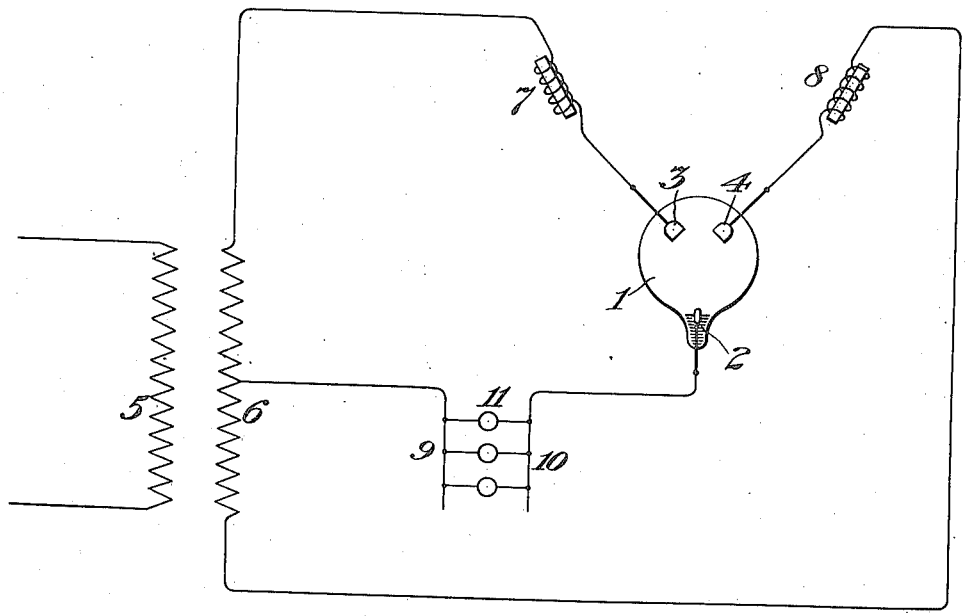

UNITED STATES PATENT OFFICE.

PERCY H. THOMAS, OF EAST ORANGE, NEW JERSEY, ASSIGNOR, BY MESNE ASSIGNMENTS, TO COOPER HEWITT ELECTRIC COMPANY, OF HOBOKEN, NEW JERSEY, A CORPORATION OF NEW JERSEY.

ELECTRICAL DISTRIBUTION SYSTEM.

1,137,174.  Specification of Letters Patent.  Patented Apr. 27, 1915.

Application filed July 6, 1904. Serial No. 215,535.

*To all whom it may concern:*

Be it known that I, PERCY H. THOMAS, a citizen of the United States, and resident of East Orange, county of Essex, State of New Jersey, have invented certain new and useful Improvements in Electrical Distribution Systems, of which the following is a specification.

The use of apparatus such as is typified by the so called mercury vapor apparatus for converting alternating into direct current is now well-known. In case it is desired to utilize a single phase alternating current source for supplying a direct current work circuit, it has been proposed to use a choke coil or other energy storing device, placing it in the lead from the negative electrode of the vapor apparatus. It is found that this location of the inductance is not in all cases the best, and I have discovered that an equivalent effect can be obtained by way of preventing the reëstablishing the negative electrode resistance in apparatus of this class, by introducing into the leads of two positive electrodes in such apparatus properly proportioned inductances. The proportions should be such that the passage of current through one positive electrode will be delayed for a sufficient time to allow current of an operating magnitude to be built up from the reserve cycle on the other positive electrode before the former drops below operating value.

The invention relates broadly to a method and apparatus for preventing the reëstablishment of the negative electrode resistance in vapor apparatus utilized for the purposes indicated without recourse to sources of current other than a single phase generating apparatus of some form in which a middle or neutral point may be located.

The invention may be utilized in connection with a vapor converter not otherwise self-operating by supplying two supplemental positive electrodes, and using the main negative electrode of the apparatus as a common negative electrode. The invention may obviously be used in connection with any desired number of phases.

I have illustrated my invention in the accompanying drawing which is a diagram of a system of circuit suited for carrying out my invention.

In the drawing 1 is a typical vapor apparatus having a negative electrode, 2, of mercury, and positive electrodes 3 and 4, which may be of iron or other solid material or may themselves be of some conducting liquid. At 5 I show the primary of a suitable transformer, the secondary of which is shown at 6. The respective terminals of the secondary 6 are connected to the positive electrodes 3 and 4, through inductances, 7 and 8, while the negative electrode 2 of the vapor apparatus is connected to an intermediate point on the secondary 6 through a work circuit 9—10 including translating devices 11, 11.

The operation of the system will be understood in view of the present state of the art, it being only necessary that the inductances 7 and 8 be properly proportioned to the needs of the service.

I claim as my invention:—

1. In a system of electrical distribution wherein a vapor converter is employed in connection with a source of single-phase alternating current and a direct current work circuit is supplied through the vapor converter, a negative electrode in the converter and a plurality of positive electrodes, and energy storing devices in the leads to the positive electrodes whereby the converter is maintained in operative condition.

2. The combination with a source of single-phase current and a work circuit supplied thereby, of a vapor converter unable of itself to maintain operation over the zero point of the supply unless means are provided for carrying it over the natural zero point, a plurality of positive electrodes and a negative electrode in the said converter and energy storing devices in the leads to the positive electrodes for preventing the extinguishment of the converter at the zero point.

3. In a system of electrical distribution, a source of alternating current, a direct current work circuit supplied therefrom, an interposed vapor converter having a suitable negative electrode and a plurality of positive electrodes, and an inductance introduced into each of the leads to a plurality of the positive electrodes for the purpose of maintaining the converter in operative condition.

4. In a system of electrical distribution, a source of alternating current, a direct current work circuit supplied therefrom, an interposed vapor converter and a positive electrode therefor, and an energy storing device in the lead thereto for the purpose of maintaining the converter in operative condition.

Signed at New York, in the county of New York, and State of New York, this 29th day of June, A. D. 1904.

PERCY H. THOMAS.

Witnesses:
WM. H. CAPEL,
GEORGE H. STOCKBRIDGE.